United States Patent [19]
Liu et al.

[11] Patent Number: 5,943,332
[45] Date of Patent: Aug. 24, 1999

[54] METHOD FOR IMPLEMENTING VIRTUAL PRIVATE WIRELESS TELECOMMUNICATIONS NETWORKS

[75] Inventors: Chung-Zin Liu; Kenneth Wayne Strom, both of Naperville, Ill.

[73] Assignee: Lucent Technologies Inc., Murray Hill, N.J.

[21] Appl. No.: 08/775,551

[22] Filed: Dec. 31, 1996

[51] Int. Cl.$^6$ ..................................................... H04B 7/216
[52] U.S. Cl. ............................ 370/342; 455/436; 455/435
[58] Field of Search .................................... 455/433, 437, 455/432, 518, 435, 456, 438, 439, 442; 370/335, 338, 328, 331, 342; 379/207

[56] References Cited

U.S. PATENT DOCUMENTS

| | | | |
|---|---|---|---|
| 5,345,502 | 9/1994 | Rothenhofer | 455/433 |
| 5,590,397 | 12/1996 | Kojima | 455/435 |
| 5,732,352 | 3/1998 | Gutowski et al. | 455/437 |

Primary Examiner—Michael Horabik
Assistant Examiner—Mohammed A. Rahim
Attorney, Agent, or Firm—Michael B. Johannesen

[57] ABSTRACT

A wireless telecommunications system that is capable of providing multiple virtual wireless networks (e.g., a public network and/or one or more private networks) from a single IS-95 compliant CDMA radio without changing the air interface or modifying existing hardware designs. Includes the steps of broadcasting from a radio a first SID/NID signal and a FOR_NID_REG signal to a wireless terminal, wherein the first SID/NID signal is associated with a first set of user zones; receiving from the wireless terminal: (1) a indicium of the wireless terminal's identity, and (2) a request to register the wireless terminal based on a second SID/NID signal, wherein the second SID/NID signal is associated with a second set of user zones; transmitting the indicium of the wireless terminal's identity to a database; receiving from the database a prioritized list of user zones based on the indicium of the wireless terminal's identity; and registering the wireless terminal based on a first user zone, which first user zone is the user zone that has the highest priority in the prioritized list of user zones and that is also a member of the second set of user zones.

12 Claims, 6 Drawing Sheets

FIG. 6

METHOD FOR IMPLEMENTING VIRTUAL PRIVATE WIRELESS TELECOMMUNICATIONS NETWORKS

FIELD OF THE INVENTION

The present invention relates to telecommunications in general, and, more particularly, to a method for implementing virtual private wireless networks.

BACKGROUND OF THE INVENTION

As public wireless telecommunications service based on CDMA becomes available, wireless service providers are increasingly interested in offering private wireless network service to select customers. To do this, the wireless service providers have two apparent options: (1) install a separate wireless network to service each private network, or (2) change the existing air interface standards to support both public and private networks and make the concomitant hardware modifications to support the changes in the air interface. Both options are considered undesirable because of the huge expense associated with implementing either option.

SUMMARY OF THE INVENTION

Embodiments of the present invention are capable of providing multiple virtual wireless networks (e.g., a public network and/or one or more private networks) on a single wireless infrastructure without many of the costs and restrictions associated with methods in the prior art. For example, embodiments of the present invention are capable of providing multiple virtual wireless networks from a single IS-95 compliant CDMA radio without changing the air interface or modifying the existing hardware design. Furthermore, no changes are required in the design of the home location register or of the protocols used to query the home location register.

These results are obtained in an illustrative embodiment of the present invention that comprises the steps of broadcasting from a radio a first SID/NID signal and a FOR__NID__REG signal to a wireless terminal, wherein said first SID/NID signal is associated with a first set of user zones; receiving from said wireless terminal: (1) a indicium of said wireless terminal's identity, and (2) a request to register said wireless terminal based on a second SID/NID signal, wherein said second SID/NID signal is associated with a second set of user zones; transmitting said indicium of said wireless terminal's identity to a database; receiving from said database a prioritized list of user zones based on said indicium of said wireless terminal's identity; and registering said wireless terminal based on a first user zone, which first user zone is the user zone that has the highest priority in said prioritized list of user zones and that is also a member of said second set of user zones.

BRIEF DESCRIPTION OF THE DRAWINGS

FIG. 2 illustrates how the sheets containing FIGS. 3, 4, 5 and 6 are interrelated.

DETAILED DESCRIPTION

Figure 1:
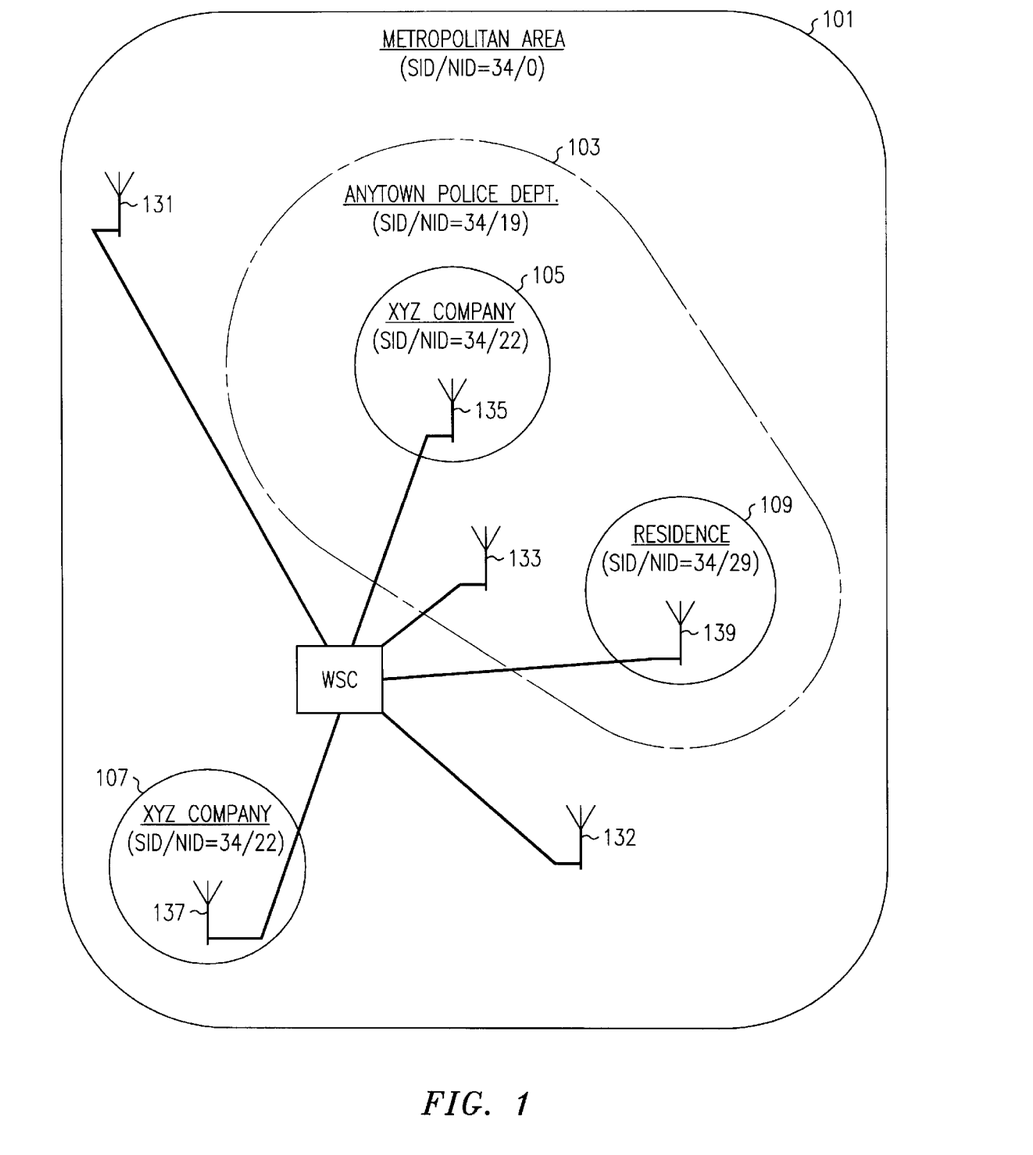
FIG. 1 depicts a map of an illustrative metropolitan area.
Figure 2:
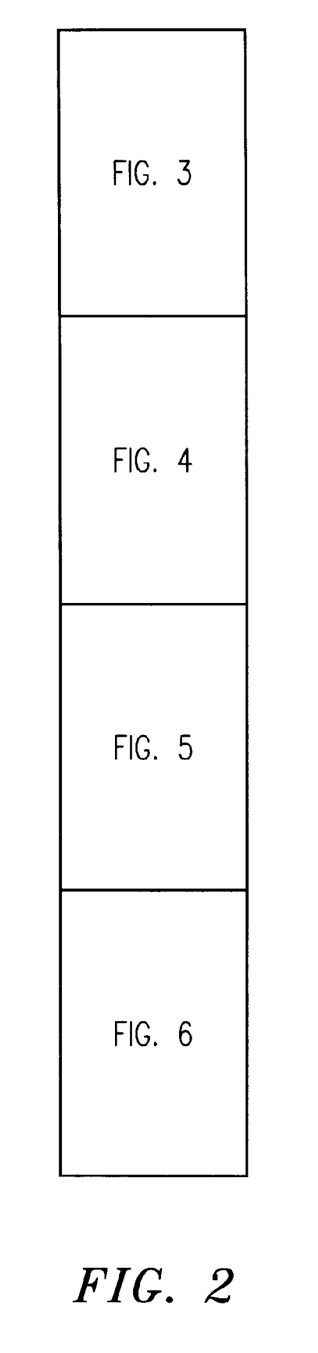

FIG. 1 depicts a map of metropolitan area 101, which is serviced by a wireless telecommunications system in accordance with an illustrative embodiment of the present invention. Within area 101 is region 103, which depicts the area protected by the Anytown Police Department and serviced by the Anytown Police Department's private wireless network. Also within area 101 are campus 105 and building 107, which are owned by the XYZ Company and serviced by the XYZ Company private wireless network. Region 103 comprises Residence 109, which is serviced by its own private wireless network, and campus 105.

In accordance with the illustrative embodiment of the present invention, all of the private wireless networks within area 101 are virtual and depend on the shared use of the wireless telecommunications system's facilities. Also in accordance with the illustrative embodiment, the wireless telecommunications system advantageously also offers public wireless service everywhere within metropolitan area 101.

The heart of the wireless telecommunications system that services area 101 is wireless switching center 121. A plurality of wireless base stations, (e.g., base stations 131, 132, 133, 135, 137 and 139) are geographically dispersed throughout area 101 and connected to wireless switching center 121. Each wireless base station advantageously comprises one or more CDMA radios. In accordance with the illustrative embodiment, each of the CDMA radios is capable of providing either: (1) public network service only, (2) public network service and private network service on one or more private networks, (3) private network service on only one private network, or (4) private network service on a plurality of private networks.

In accordance with the illustrative embodiment of the present invention, each CDMA radio associated with each base station in area 101 advantageously broadcasts a System Identification signal and a Network Identification signal on the Overhead Paging Channel. For the purposes of this specification, the combination of a System Identification signal and a Network Identification signal will be called an "SID/NID signal."

In accordance with the IS-95 and ANSI J__STD__008 CDMA air interface standards, the System Identification signal identifies a wireless service provider. For the purposes of the illustrative embodiment, the System Identification is 34. Although the IS-95 air interface standard provides for a Network Identification signal to be broadcast too, the standard does not strictly restrict how the signal is to be used or interpreted.

In accordance with the illustrative embodiment of the present invention, the combination of the System Identification signal and the Network Identification signal (i.e., the SID/NID signal) are used to partition, geographically and/or logically, a portion of the wireless telecommunications system into multiple virtual wireless networks (e.g., a public network and/or one or more private networks). Therefore, the combination of the System Identification and the Network Identification (i.e., the SID/NID signal) are needed to uniquely identify and distinguish each network (including the public network) from the others. For the purposes of the illustrative embodiment, the Network Identification for the public network is zero (0).

As shown in Table 1, the public network and each virtual private network are assigned a unique SID/NID signal.

TABLE 1

| Network | SID/NID Signal |
|---|---|
| Public Network | 34/0 |
| Anytown Police Department Private Network | 34/19 |
| XYZ Company Private Network | 34/22 |
| Residence Private Network | 34/29 |

Also in accordance with the illustrative embodiment of the present invention, each CDMA radio associated with each base station in area 101 advantageously broadcasts a "foreign network registration signal" on the Overhead Paging Channel. For the purposes of this specification, the foreign network registration signal will be called a "FOR_NID_REG signal."

In accordance with IS-95 and ANSI J_STD_008 CDMA air interface standards, the FOR_NID_REG signal indicates whether the radio that broadcast the signal will entertain registration requests on other networks than that associated with the broadcast SID/NID signal. The FOR_NID_REG signal is a binary signal that has one of two values: "ALLOWED" and "PROHIBITED." When the FOR_NID_REG signal "ALLOWED" is broadcast, it means that the radio will entertain registration requests on other networks than that associated with the broadcast SID/NID signal; in contrast, when the FOR_NID_REG signal "PROHIBITED" is broadcast, it means that the radio will only entertain registration requests on the network associated with the broadcast SID/NID signal As shown in FIG. 1, the wireless service provider and each entity sponsoring a private network must decide where, geographically, the public network and each private network's service will be available. According to the illustrative embodiment, the Anytown Police Department has decided that its private network should be available to its members when they are within region 103. The XYZ Company has decided that its private network should be available to its employees and customers when they are within campus 105 or building 107. It is important to note that the service area of one virtual network need not have any relation to the service area of another virtual network. The two can be adjacent, overlaid, partially overlaid or not adjacent to each other.

The homeowner of Residence 109 has decided that his private network should be available to the members of his family only when they are within their residence. Furthermore, the wireless service provider and/or the homeowner of Residence 109 have decided that public network service should not be offered by the base station within Residence 109 (base station 139). This does not imply that public network service will not be available to customers who are within Residence 109, only that it will not be offered by base station 139. If the wireless service provider chooses, it can offer public network service to customers within Residence 109 by, for example, a radio associated with either base station 132, base station 133 or both.

It is preferred that each geographic region serviced by the public network and not by any private network has one or more CDMA radios in that region that broadcast the SID/NID signal of the public network and FOR_NID_REG signal "PROHIBITED."

It is preferred that each geographic region serviced by the public network and at least one private network has one or more CDMA radios in that region that broadcast the SID/NID signal of the public network or one of the private networks and FOR_NID_REG signal "ALLOWED."

It is preferred that each geographic region serviced by only one private network but not the public network has one or more CDMA radios in that region that broadcast the SID/NID signal associated with that private network and FOR_NID_REG signal "PROHIBITED."

It is preferred that each geographic region serviced by a plurality of private networks but not the public network has one or more CDMA radios in that region that broadcast the SID/NID signal of one of the private networks and the FOR_NID_REG signal "ALLOWED."

In an alternative embodiment of the present invention, the FOR_NID_REG signal "ALLOWED" could mean that the associated radio will accept registration requests to all networks supported by the wireless switching center. In accordance with this embodiment of the present invention, however, the FOR_NID_REG signal "ALLOWED" means that the associated radio will entertain registration requests for only previously specified networks.

In accordance with the illustrative embodiment, base stations 131 and 132 advantageously each have at least one CDMA radio that broadcasts the SID/NID signal 34/0 and the FOR_NID_REG signal "PROHIBITED" on the Overhead Paging Channel. Base station 133 has at least one CDMA radio that broadcasts the SID/NID signal 34/0 and the FOR_NID_REG signal "ALLOWED" on the Overhead Paging Channel. The radios associated with base station 133 are also programmed to allow authorized users to register on the Anytown Police Department's private network (SID/NID signal 34/19).

Base station 135 has at least one CDMA radio that broadcasts the SID/NID signal 34/0 and the FOR_NID_REG signal "ALLOWED" on the Overhead Paging Channel. The radios associated with base station 135 are also programmed to allow authorized users to register on the Anytown Police Department's private network (SID/NID signal 34/19) and the XYZ Company private network (SID/NID signal 34/22).

Base station 137 has at least one CDMA radio that broadcasts the SID/NID signal 34/0 and the FOR_NID_REG signal "ALLOWED" on the Overhead Paging Channel. The radios associated with base station 137 are also programmed to allow authorized users to register on the XYZ Company private network (SID/NID signal 34/22).

Base station 139 advantageously has at least one CDMA radio that broadcasts the SID/NID signal 34/29 and the FOR_NID_REG signal "PROHIBITED."

It will be clear to those skilled in the art how to assign radios throughout a geographic region so that multiple virtual networks can be implemented according to embodiments of the present invention.

Also in accordance with the illustrative embodiment, each virtual private network is partitioned into a plurality of "user zones" or "user groups," each of which has an associated set of telecommunications features and restrictions. Each sponsor of a private network must identify what user zones the private network will support, which wireless terminals will be allowed access to the private network and what user zone each wireless terminal will be afforded.

For the purposes of the illustrative embodiment, the wireless telecommunications system offers 9 user zones, numbered one (1) through nine (9). It will be clear to those skilled in the art how to implement and use user zones and how to implement and use the features and restrictions associated with those user zones.

Table 2 indicates which user zones XYZ Company's private network will support.

TABLE 2

| XYZ Company's User Zones |
|---|
| 1 |
| 4 |
| 7 |

Table 3 indicates which user zones Anytown Police Department's private network will support.

TABLE 3

| Anytown Police Department's User Zones |
|---|
| 2 |
| 3 |
| 4 |

Table 4 indicates which user zones Residence's private network will support.

TABLE 4

| Residence's User Zones |
|---|
| 1 |
| 6 |

Because access to private networks should be restricted, each wireless terminal contains a prioritized list of the networks that it can access. For example, an illustrative user, Alice, has a wireless terminal that contains an indicium of the wireless terminal's identity. That indicium is advantageously the Mobile Identification Number or "MiN." Alternatively, the indicium could be the electronic serial number or "ESN" of the wireless terminal or the International Mobile Station Identity "IMSI." The MIN of Alice's wireless terminal is 708-604-7555. Furthermore, Alice has been granted access to the Anytown Police Department's private network and Residence's private network. As shown in Table 5, her wireless terminal contains a prioritized list of the networks to which her wireless terminal has been granted access.

TABLE 5

| Priority | Network | SID/NID Signal |
|---|---|---|
| 1st | Residence | 34/29 |
| 2nd | Anytown Police Department | 34/19 |
| 3rd | Public Network | 34/0 |

A database (e.g., a database in the local wireless switching center and/or the home location register of the wireless terminal) advantageously contains a table that maps a wireless terminal's MIN (or, alternatively, a directory number associated with that wireless terminal) to a prioritized list of the user zones that are available to that wireless terminal. Table 6 depicts a portion of such a table in accordance with the illustrative embodiment.

TABLE 6

| MIN (or DN) | Wireless Terminal Owner | Prioritized User Zone (Highest Priority First) |
|---|---|---|
| ... | ... | ... |
| 708-112-2345 | Ken | 1 |
| 708-115-2773 | Chung | 5, 4 |
| 708-604-7555 | Alice | 1, 4, 7 |
| ... | ... | ... |

The database also preferably contains a table that maps a wireless terminal's directory number or MIN to the set of features and restrictions that the wireless terminal is provided. Table 7 depicts a portion of such a table.

TABLE 7

| MIN (or DN) | Privileges | Restrictions |
|---|---|---|
| ... | ... | ... |
| 564-675-3221 | Flat-rate billing; 4 digit dialing; caller ID; call forwarding; call waiting; three-way calling | None |
| 708-604-7555 | Flat-rate billing; 4 digit dialing; caller ID; call forwarding; call waiting | No international calls |
| 000-345-6678 | Flat-rate billing; 4 digit dialing; caller ID | No international calls; no evening calls |
| 000-345-6679 | Flat-rate billing; 4 digit dialing; caller ID | No long distance calls |
| ... | ... | ... |

And because each user afforded access to a private network on a given user zone should be afforded the same privileges and restrictions, regardless of what privileges and restrictions they would be afforded on the public network, a new table in accordance with the illustrative embodiment is created. As shown in Table 8, this table maps user zones to a "pseudo" directory number" which is a directory number that can never naturally occur according to the dialing plan. An entry is then made in Table 7 which uses the pseudo directory number as the index to determine what privileges and restrictions the user should be afforded.

TABLE 8

| User Zone | Pseudo Directory Number |
|---|---|
| ... | ... |
| 4 | 000-345-6678 |
| 5 | 000-345-6679 |
| 6 | 000-345-6680 |
| ... | ... |

FIGS. 3, 4, 5 and 6 depict a flowchart of the steps involved in registering a wireless terminal in accordance with the illustrative embodiment of the present invention. For pedagogical purposes, the illustrative embodiment of the present invention will be described in terms of how it operates to provide service to the user Alice when she is within campus 105.

From Tables 2, 3, 5 and 6 it can be observed that Alice's wireless terminal has been granted User Zone 4 access to Anytown Police Department's network and User Zone 1 access to Residence's private network. As shown in Table 5, Alice's wireless terminal, which has the MIN 708-604-7555, has been programmed to attempt access to, in order of priority: Residence's private network, Anytown Police Department's private network, and then the public network. Alice's wireless terminal has not been granted access to the XYZ Company's private network.

Figure 3:
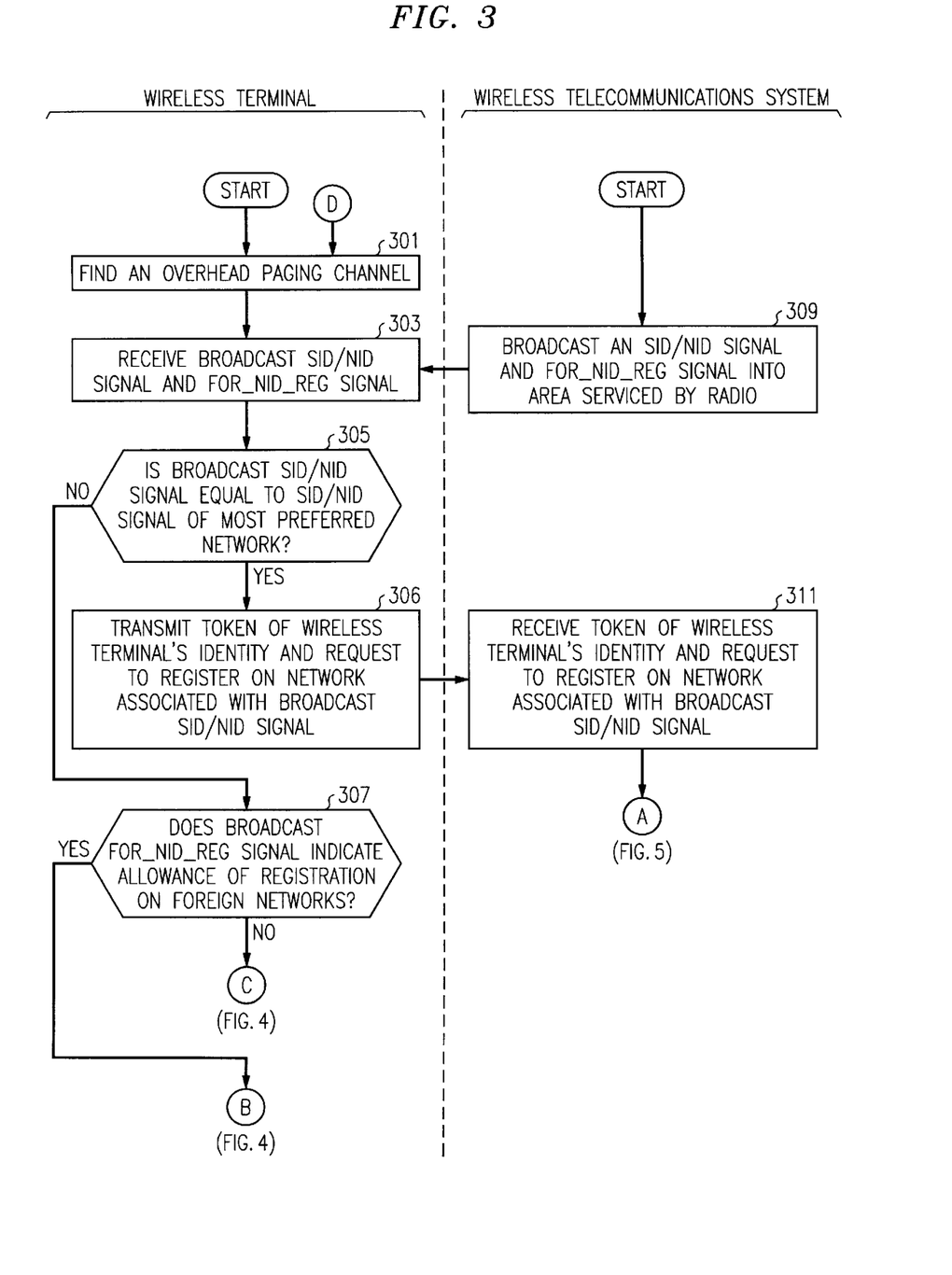
FIG. 3 depicts a portion of a flowchart in accordance with an illustrative embodiment of the present invention, which is continued in FIG. 4.

When Alice powers up her wireless terminal, it begins listening for an Overhead Paging Channel, as shown in FIG. 3 at step 301. Concurrently, as shown at step 309, a CDMA radio associated with base station 135 broadcasts the SID/NID signal 34/0 and FOR_NID_REG signal "ALLOWED" on the Overhead Paging Channel.

Because Alice is within campus 105, her wireless terminal receives, via the Overhead Paging Channel, the SID/NID signal 34/0 and the FOR_NID_REG signal "ALLOWED," as shown at step 303. As shown at step 305, the wireless terminal determines if the broadcast SID/NID signal is that of her most preferred network (Residence's private network—SID/NID signal 34/29). Because Alice's wireless terminal's first preference is not the SID/NID signal that it receives on the Overhead Paging Channel, the answer is negative and control passes to step 307. (Had the answer been affirmative, then control would have passed to step 306 where Alice's wireless terminal would have transmitted a registration request on the network associated with the broadcast SID/NID signal.)

Figure 4:
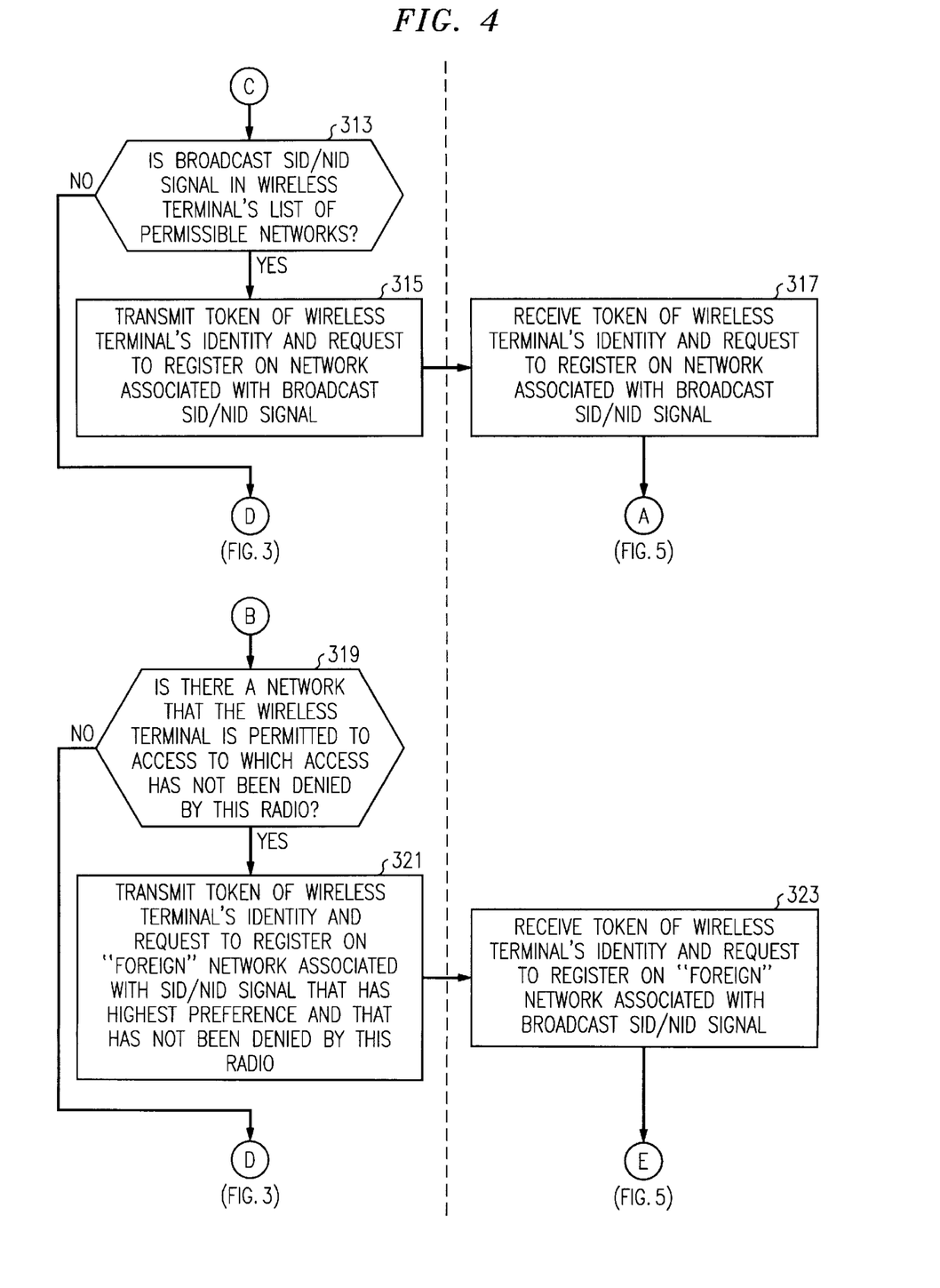
FIG. 4 depicts a portion of a flowchart in accordance with an illustrative embodiment of the present invention, which was begun in FIG. 3 and that is continued in FIG. 5.

As shown at step 307, the wireless terminal determines if the FOR_NID_REG signal "ALLOWED" has been broadcast. Because the answer is affirmative, control passes to step 319. (Had the answer been negative, control would have passed to step 313, where Alice's wireless terminal would have determined whether the broadcast SID/NID signal was in the wireless terminal's list of permissible networks (i.e., in Table 5). If it was, then control would pass to step 315 where the wireless terminal would transmit a request for registration on the network associated with the broadcast SID/NID signal. If it was not, then Alice's terminal would not be permitted to access any network via this radio and control would pass to step 301, where Alice's terminal would begin the process of listening for a different overhead paging channel.)

At step 319, Alice's terminal determines if there is a network that the terminal is permitted access to which has not been denied by this radio. At this point, the radio is permitted access to three networks (the Residence network, the Anytown Police Department network and the public network) and the radio has not denied access to any of them. Therefore, because the answer is affirmative, control passes to step 321. (Had the answer been negative, it would have meant that Alice's terminal would not be permitted to access any network via this radio and control would pass to step 301, where Alice's terminal would begin the process of listening for a different overhead paging channel.)

At step 321, Alice's wireless terminal transmits to the radio (1) an indicium of its identity, preferably its MIN, and (2) a request to register on the network that has the highest preference and that has not been denied access by this registration. In this case, Alice's wireless terminal's highest preference is for the Residence private network (SID/NID signal 34/29). The radio receives the request, at step 323. At step 327, the wireless telecommunications system determines if the radio has been programmed to provide access to Residence's private network. Because the answer is negative, control passes to step 329, which transmits a denial of the registration request. Alternatively, the wireless telecommunication system could imply the denial of the request by merely failing to transmit an acceptance message within a fixed period of time. The wireless terminal could infer the denial of the registration request by the failure to receive an acceptance message within that period of time. (Had the answer been affirmative, control would have passed to step 331 for the initiation of the registration process.)

At step 325, Alice's wireless terminal receives the denial and control passes to step 319. At step 319, Alice's terminal determines if there is a network that the terminal is permitted access to which has not been denied by this radio. At this point, the radio is permitted access to three networks (the Residence network, the Anytown Police Department and the public network), but has been denied access to only one of them. Therefore, the affirmative response passes control to step 321.

At step 321, Alice's wireless terminal transmits to the radio (1) an indicium of its identity, preferably its MIN, and (2) a request to register on the network that has the highest preference and that has not been denied access by this registration. In this case, Alice's wireless terminal's next highest preference is for the Anytown Police Department's network (SIDINID signal 34/19).

At step 323, the radio associated with base station 135 receives the indicium of the wireless terminal's identity (MIN=708-604-7555) and the request to establish the communications channel based on SID/NID signal 34/19. At step 327, the wireless telecommunications system determines if the radio has been programmed to provide access to Residence's private network. Because the answer is affirmative, control passes to step 331 for initiation of the registration process.

Figure 5:
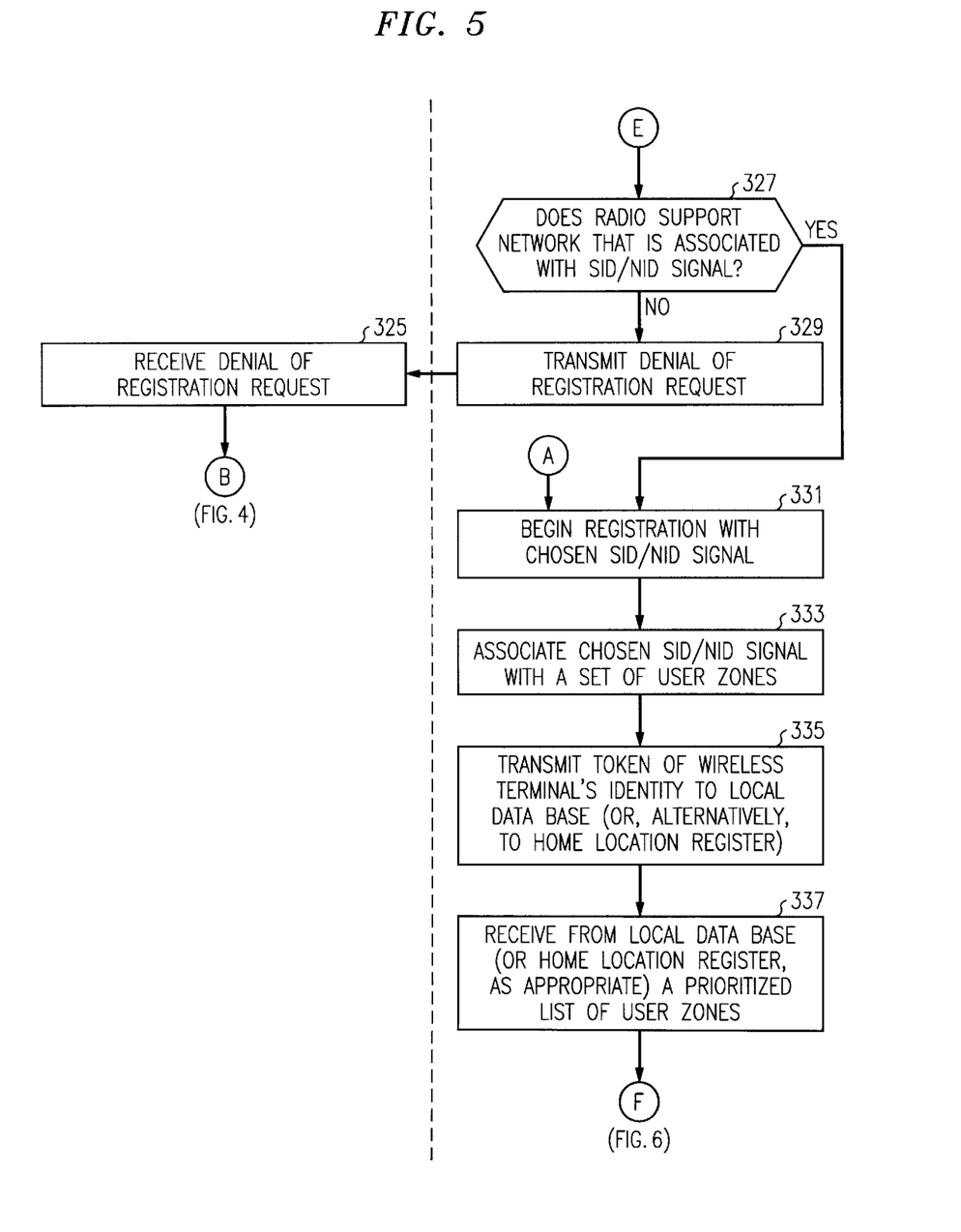
FIG. 5 depicts a portion of a flowchart in accordance with an illustrative embodiment of the present invention, which was begun in FIG. 4 and that is continued in FIG. 6.

At step 333, the wireless telecommunications system determines (from Table 3) that the Anytown Police Department's private network supports user zones 2, 3 and 4.

At step 335, the wireless telecommunications system transmits the indicium of the wireless terminal's identity (MIN=708-604-7555) to that terminal's home location register. In response, at step 337, the system receives from the home location register a prioritized list of user zones. From Table 6 above, we can see that the prioritized list for Alice's wireless terminal is "1, 4, 7." It will be clear to those skilled in the art that set 333 could have been performed before, after or concurrently with steps 335 and 337.

At step 339, the system determines which of the supported user zones has the highest priority on Alice's prioritized list. The highest priority user zone on Alice's prioritized list is 1. But since that user zone is not supported by the Anytown Police Department private network, it is not used. The next highest priority user zone on Alice's prioritized list is 4, which is supported by the Anytown Police Department network, and it is therefore selected as the user zone for registration.

Next, in accordance with step 341 and Table 8, a pseudo directory number is determined based on the selected user zone. Because it has been determined that the user zone for this registration is User Zone 4. Table 8 provides the pseudo directory number 000-345-6678. In accordance with step 343, the pseudo directory number 000-345-6678 is advantageously used as an index into Table 7 to determine the feature set that the communication channel with Alice's wireless terminal will be afforded. From Table 7, it can be seen that the call should be afforded flat-rate billing, 4 digit dialing and caller ID. but that there should be no international or evening calls.

Figure 6:
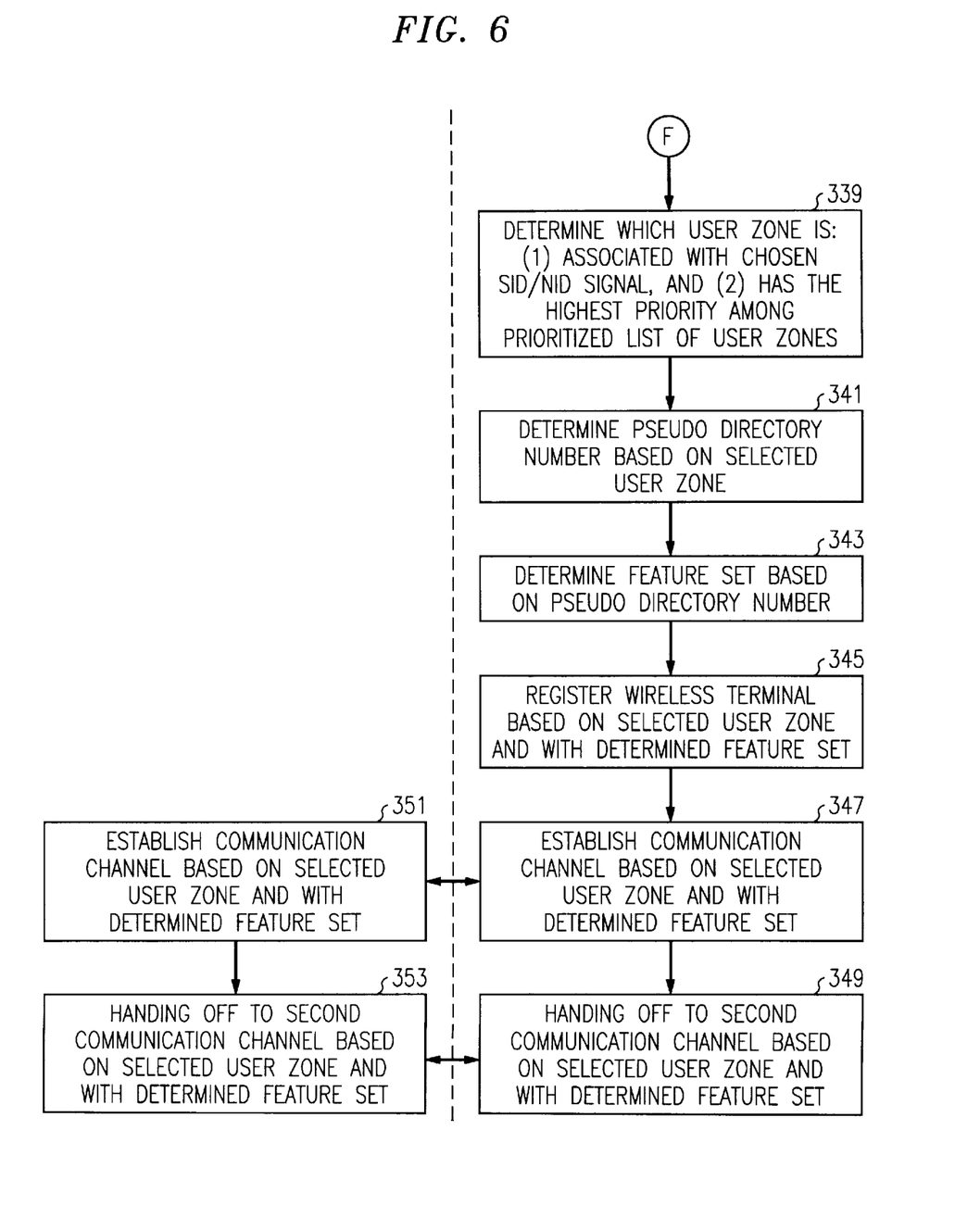
FIG. 6 depicts a portion of a flowchart in accordance with an illustrative embodiment of the present invention, which is continued from FIG. 5.

In accordance with step 345, the wireless telecommunications system registers the wireless terminal based on the selected user zone, User Zone 4 and with the determined feature set, in well known fashion.

In accordance with steps 347 and 351, a communication channel is subsequently established based on the selected user zone, User Zone 4, and the above feature set, In accordance with steps 349 and 353, Alice's wireless terminal is handed-off to a second communication channel based on the selected user zone, User Zone 4, and the above feature set, in well-known fashion.

It is to be understood that the above-described embodiment is merely an illustrative principle of the invention, and that many variations may be devised by those skilled in the art without departing from the scope of this invention. It is, therefore, intended that such variations be included within the scope of the claims.

What is claimed is:

1. A method comprising the steps of:

broadcasting from a radio a first SID/NID signal and a FOR_NID_REG signal to a wireless terminal, wherein said first SID/NID signal is associated with a first set of user zones;

wherein SID/NID is the combination of the system identification signal and network identification signal and FOR_NID_REG is the foreign network registration signal;

receiving from said wireless terminal: (1) a indicium of said wireless terminal's identity and (2) a request to register said wireless terminal based on a second SID/NID signal, wherein said second SID/NID signal is associated with a second set of user zones;

transmitting said indicium of said wireless terminal's identity to a database;

receiving from said database a prioritized list of user zones based on said indicium of said wireless terminal's identity; and registering said wireless terminal based on a first user zone, which first user zone is the user zone that has the highest priority in said prioritized list of user zones and that is also a member of said second set of user zones.

2. The method of claim 1 further comprising the step of establishing a communication channel with said wireless terminal via said radio.

3. The method of claim 2 further comprising the step of offering a set of features to said wireless terminal based on said first user zone.

4. The method of claim 3 wherein said communications channel is based on CDMA.

5. The method of claim 1 wherein said indicium of said wireless terminal's identity is a mobile identification number.

6. The method of claim 1 wherein said database is the home location register of said wireless terminal.

7. A method comprising the steps of:

broadcasting from a first radio a first SID/NID signal and a first FOR_NID_REG signal to a wireless terminal, wherein said first SID/NID signal is associated with a first set of user zones;

wherein SID/NID is the combination of the system identification signal and network identification signal and FOR_NID_REG is the foreign network registration signal;

broadcasting from a second radio a second SID/NID signal and a second FOR_NID_REG signal to said wireless terminal, wherein said second SID/NID signal is associated with a second set of user zones;

receiving from said wireless terminal: (1) a indicium of said wireless terminal's identity, and (2) a request to said register said wireless terminal based on a third SID/NID signal;

transmitting said indicium of said wireless terminal's identity to a database;

receiving from said database a prioritized list of user zones based on said indicium of said wireless terminal's identity; and registering said wireless terminal based on a first user zone, which first user zone is a user zone that has the highest priority in said prioritized list of user zones and that is also a member of said first set of user zones.

8. The method of claim 7 further comprising the step of establishing a first communication channel with said wireless terminal.

9. The method of claim 8 further comprising the step of handing-off said wireless terminal to a second communications channel based on a second user zone, which second user zone is a user zone that has the highest priority in said prioritized list of user zones and that is also a member of said second set of user zones.

10. The method of claim 9 wherein said first communications channel and said second communications channel are based on CDMA.

11. The method of claim 9 wherein said first user zone is associated with a first geographic region and said second user zone is associated with a second geographic region.

12. The method of claim 7 wherein said database is the home location register of said wireless terminal.

* * * * *